United States Patent [19]

Hamelin et al.

[11] Patent Number: 4,802,374

[45] Date of Patent: Feb. 7, 1989

[54] DEVICE FOR CONTROLLING THE DISPLACEMENT OF AN ELEMENT, IN PARTICULAR OF A SEAT OR PARTS OF A SEAT OF A MOTOR VEHICLE, IN RELATION TO A BASE

[75] Inventors: Rene-Louis Hamelin, Gif sur Yvette; Maurice F. Wattier, Sissonnes, both of France

[73] Assignee: Equipments Automobiles Marchal, Issy les Moulineaux, France

[21] Appl. No.: 6,689

[22] PCT Filed: Apr. 14, 1986

[86] PCT No.: PCT/FR86/00122

§ 371 Date: Feb. 5, 1987

§ 102(e) Date: Feb. 5, 1987

[87] PCT Pub. No.: WO86/06036

PCT Pub. Date: Oct. 23, 1986

[30] Foreign Application Priority Data

Apr. 18, 1985 [FR] France ................ 85 05879

[51] Int. Cl.[4] ............................ F16H 1/16; B60N 1/02; B60N 1/08
[52] U.S. Cl. ..................... 74/89.14; 74/89.15; 74/425; 248/429
[58] Field of Search ............... 248/430, 429; 74/89.15, 74/89.14, 425

[56] References Cited

U.S. PATENT DOCUMENTS

| | | | |
|---|---|---|---|
| 969,214 | 9/1910 | Spellman et al. | 74/425 |
| 2,173,660 | 9/1939 | Perkins | 74/425 |
| 2,586,293 | 2/1952 | Birkigt | 74/425 |
| 2,919,744 | 1/1960 | Tanaka | 248/429 |
| 2,927,627 | 3/1960 | Lohr | 248/429 |
| 3,202,015 | 8/1965 | Moul et al. | 74/425 |
| 3,617,021 | 11/1971 | Littmann | 248/393 |
| 3,884,040 | 5/1975 | Green | 74/89.14 |
| 3,951,004 | 4/1976 | Huesch | 74/89.15 |
| 4,534,233 | 8/1985 | Hamaguchi | 74/89.15 |

FOREIGN PATENT DOCUMENTS

| | | | |
|---|---|---|---|
| 0106244 | 4/1984 | European Pat. Off. | 74/89.15 |
| 0135434 | 11/1902 | Fed. Rep. of Germany . | |
| 17755740 | 1/1972 | Fed. Rep. of Germany . | |
| 1105315 | 11/1955 | France . | |
| 2072881 | 10/1981 | United Kingdom . | |

Primary Examiner—Leslie A. Braun
Assistant Examiner—Scott Anchell
Attorney, Agent, or Firm—Cushman, Darby & Cushman

[57] ABSTRACT

The control device comprises a motor (5) having a shaft (7a) provided at one end with a worm (8a) to drive a nut-wheel (9a), the set of the worm (8a) and of the nut-wheel (9a) forming part of a reduction gear (R). A screw (12a) cooperates with the nut (11a). This screw (12a) is fixed in rotation around its axis. The reduction gear (R) comprises a stirrup (26a) comprising two intersecting cylindrical sleeves (30a, 31a) communicating through an opening (W). One (30a) of these sleeves receives the nut-wheel (9a). The worm (8a) is accommodated in a tube (10a), connected to the casing (6) of the motor (5), which comprises a window (32a) on its cylindrical wall at one end intended to be engaged in the other sleeve. For the assembly of the reduction gear, the above mentioned end of the tube (10a) is fitted in the other sleeve (31a) of the stirrup (26a) so that the above mentioned window should come to be opposite the above mentioned opening (W). The threads of the worm (8a) project through the said window (32a) to mesh with the nut-wheel (9a).

13 Claims, 6 Drawing Sheets

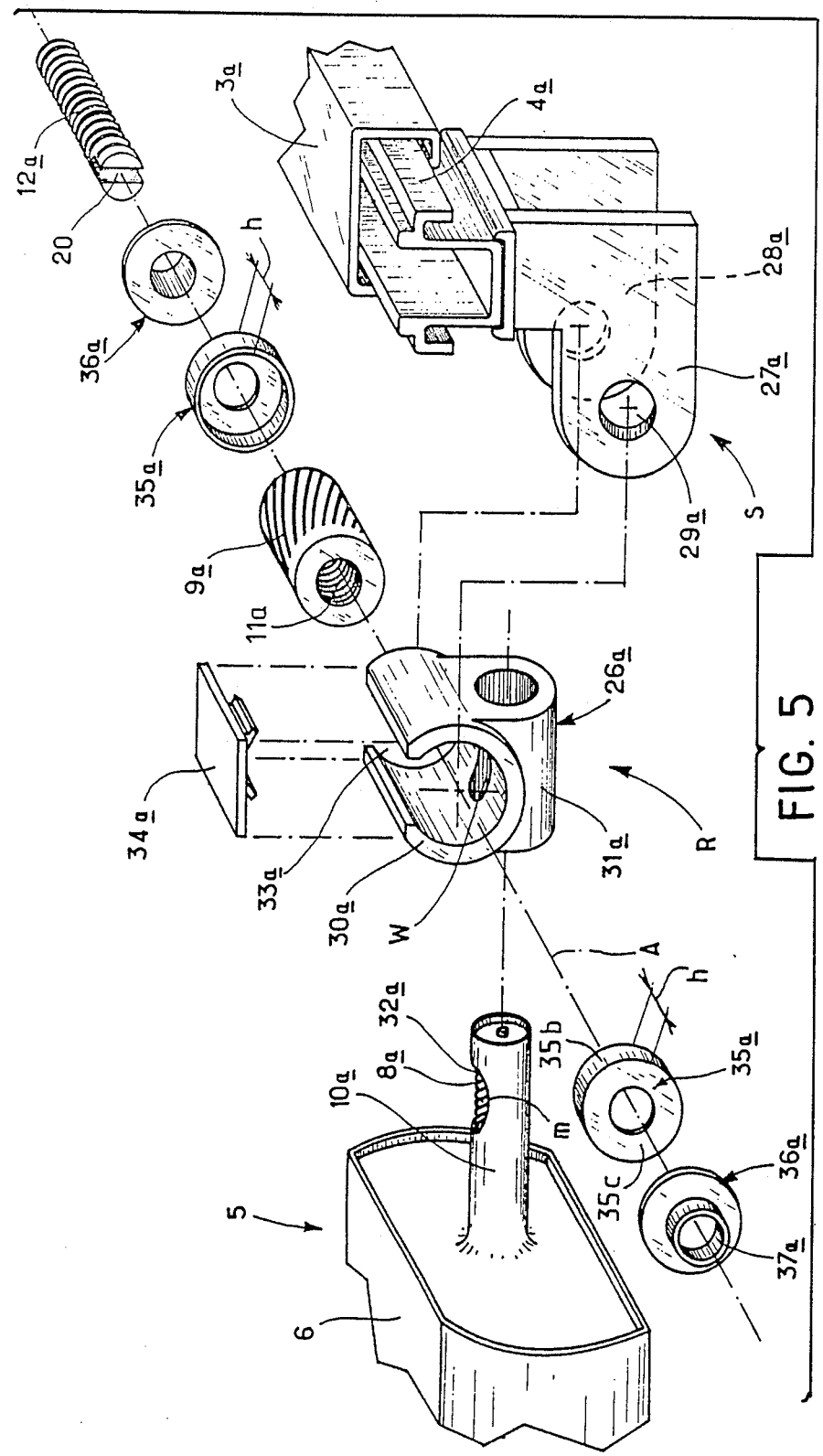

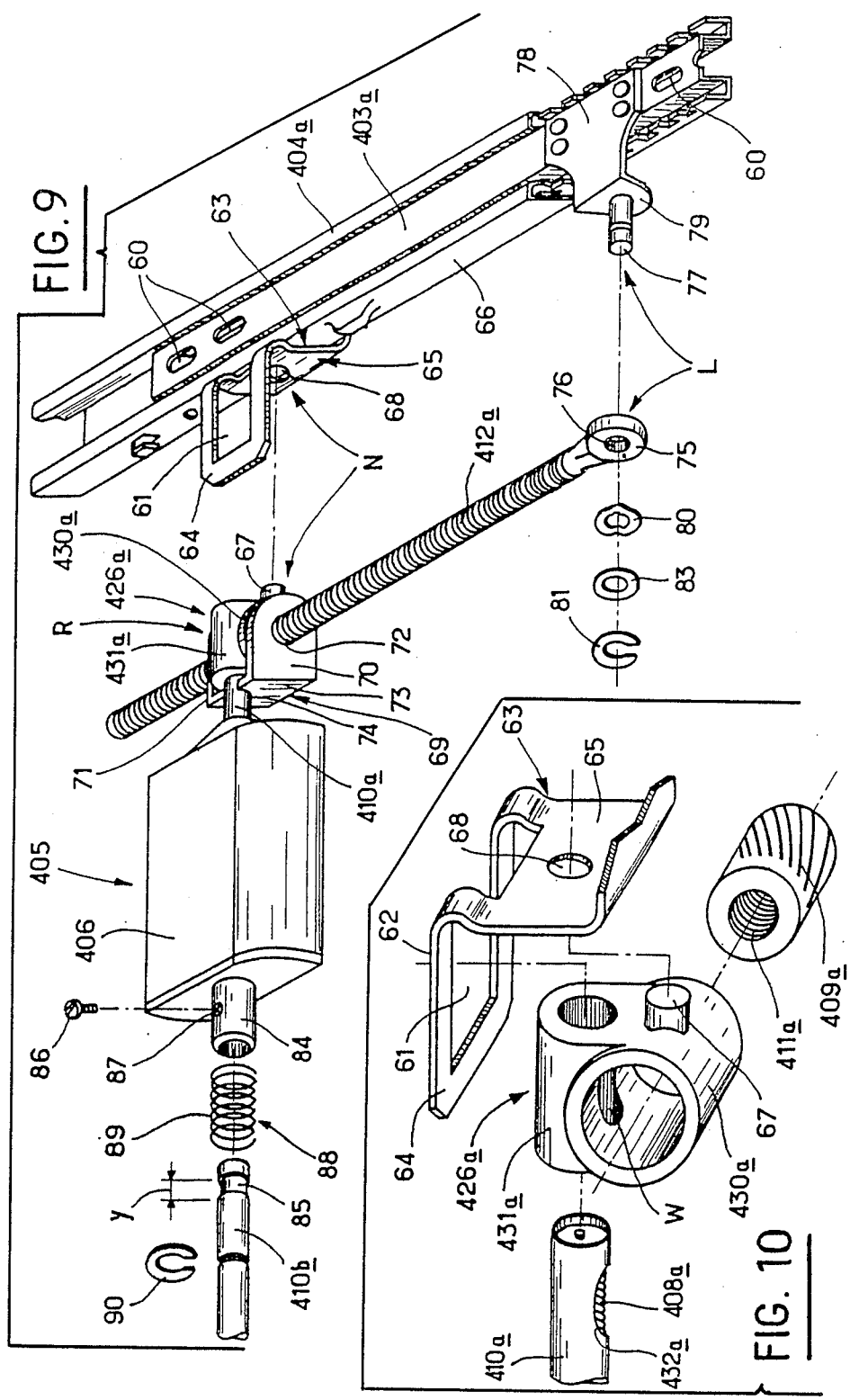

DEVICE FOR CONTROLLING THE DISPLACEMENT OF AN ELEMENT, IN PARTICULAR OF A SEAT OR PARTS OF A SEAT OF A MOTOR VEHICLE, IN RELATION TO A BASE

The invention relates to a device controlling the displacement of an element in relation to a base, a device of the kind comprising a motor having a shaft provided at one end with a worm, or an equivalent part, capable of driving a nut-wheel whose axis is orthogonal to the direction of the shaft of the motor, the worm and nut-wheel unit forming part of a reduction gear whilst a screw of similar, cooperates with the nut of the nut-wheel, provision being moreover made for displacement guidance means between the base and the element.

The invention concerns more particularly, because it is in this case that its application seems to have the greatest advantage, but not exclusively so, a device for controlling the displacements of the elements of a motor vehicle, in particular, of a seat of this vehicle.

Many solutions have hitherto been proposed for such a control. However, the transmission of the rotational motion between the shaft of the motor and the nut-wheel poses problems. It is in particular desirable that the reduction gear comprising the worm and the nut-wheel should be of small size and simple and fast to assemble. It is, moreover, desired, to compensate for the deviations inherent in all manufacture of the relative geometrical positions of the components of the device.

In the text below, the term nut-wheel, or quite simply, wheel will be used interchangeably (for the purpose of simplification) to designate the same element.

The devices of the kind defined above have the advantage of immobility of the worm in rotation around its axis in relation to the element to be displaced, which simplifies the mounting of the worm. Moreover, the transmission of the forces between the nut-wheel and the screw engaged in the nut is effected under favourable conditions over the whole periphery of the screw.

The purpose of the invention is above all to make the devices of the kind defined above in such a way that they should meet the various practical requirements better than heretofore and in particular, that the reduction gear should be of small size and easy and fast to assemble. Preferably the invention aims to absorb the deviations related to the manufacturing tolerances, in the relative geometrical positions of the various components of the device, in relation to the element, in particular between the element and the motor during the displacement of the said element.

In accordance with the invention, a device for controlling the displacement of an element in relation to a base, of the kind defined above, is characterized in that the reduction gear comprises a stirrup comprising two orthogonal intersecting cylindrical sleeves, the internal space of these sleeves communicating via an opening corresponding to the intersection, one of these sleeves being capable of accommodating the nut wheel, whilst the worm is accommodated in a tube connected to the motor casing which comprises a window corresponding to the intersection of the sleeves on its cylindrical wall at one end intended to be engaged in the second sleeve of the stirrup, so that, for the assembly of the reduction gear, the above mentioned end of the tube is fitted in the said second sleeve of the stirrup for the above mentioned window to come to be opposite the above mentioned opening and for the threads of the worm projecting through the said window to be able to mesh with the nut-wheel which is fitted in the first sleeve mounted between two sides comprising holes for the passing of the screw.

In the case of an element guided by two substantially parallel slides, transversely interspaced from each other, the motor is disposed between these two slides and comprises two shaft outputs orientated substantially orthogonally to the slides, the motor being situated nearer one of the slides than the other and the tube, of shorter length, situated between the motor and the nearer slide, is integral with the motor casing.

The two sides which the stirrup sleeve is mounted which is intended to accommodate the nut-wheel, are preferably the two sides of a forked end fixed to one of the parts constituted by the element to be displaced and the base, or fixed to a member connected to one of these two parts.

Cups may be fitted on the wheel at each end of the sleeve, with a light grip, these cups serving as bearings for the wheel.

The wheel can be made of a hard plastic material, whilst the cups are metallic.

Advantageously the screw is stationary in rotation around its axis.

The screw, or equivalent, intended to be engaged in the nut of the nut-wheel can be mounted with scope for displacement, at least along a direction substantially parallel to that of the motor shaft.

In these circumstances, if the element to be displaced deviates from its theoretical trajectory in the course of its motion because of the production tolerances, the scope for displacement of the screw makes it possible to make good the imperfections inherent in all manufacture.

Advantageously, the portion of the drive shaft of the motor extending between the motor and the worm is rigid and has its length determined by the assembly.

In the case of the actuation of a translational displacement of an element guided by a slide along a rectilinear direction, since the screw is orientated parallel to the direction of displacement, this screw is, in accordance with the invention, advantageously mounted on the element so as to be capable of displacement parallel to itself along a direction substantially orthogonal to that of the screw axis.

Preferably the screw is integral with a flap mounted on a part of the said element with scope of angular deflection around a longitudinal axis parallel to the screw but at a distance from the latter.

The screw may be connected to the element to be displaced in which case, the casing of the motor remains stationary in relation to the base. As a variant, the screw may be connected to the base and hence remain stationary whilst the casing of the motor which is being displaced is connected to the above mentioned element to be displaced.

In general, the element to be displaced in translation is guided by two substantially parallel slides transversely interspaced from each other, the said element comprising sliders engaged on each slide; the motor is disposed between theses two slides and comprises two shaft outputs orientated substantially orthogonally to the slides; a screw connected to the element is associated with each slider whilst the adjoining end of the portion of the corresponding shaft is fitted with a worm capable of cooperating with a nut-wheel associated with each screw; in that case, each portion of the motor shaft extending between the motor and the associated nut-wheel is rigid and has a fixed length, whilst each screw is mounted on a slider associated with a slide with scope for displacement along a direction parallel to that of the motor shaft.

The device of the invention can also be used for controlling the rotational displacement of an element around a pivot which constitutes the means for guiding this element in relation to the base; in that case, the screw engaged in the nut-wheel is connected to the said element by an articulation permitting sufficient angular deflection of the screw in a plane parallel to the shaft of the motor, the said nut-wheel and the motor being, moreover, mounted with scope for rotation around an axis parallel to the pivot.

The device controlling the translation displacement defined above may be used to actuate displacement towards the front or the rear of a seat of a motor vehicle, this seat being provided under its bottom with sliders capable of displacement in two parallel slides, the screw associated with each slide being connected to the corresponding slider with scope for displacement along a direction parallel to that of the motor shaft.

The rotation lock of each screw in relation to the associated flap can be ensured by the cooperation of a slot provided at each end of the screw wherein the edge of a cut-out which is provided in the flap to serve as accommodation for the screw is engaged.

The flap can be constituted by a sheet disposed edgewise, held against the internal face of a slider, integral with the element, this sheet having a longitudinal articulation component, such as a rib capable of cooperating with a side of the slider.

Such a device for controlling the translational displacement can also be used for adjusting the height and angle of a seat of a motor vehicle. Provision is made in that case, preferably at the front of the seat for two vertical slides, a screw oriented vertically being associated with each slide and being connected to the seat with scope for displacement along an orthogonal direction parallel to that of the shaft of the motor.

Each flap carrying a screw may be provided with a casing covering the screw.

It is, moreover, desirable for the fixing of the stirrup to a support connected to one of the two components constituted by the support and the element to be displaced, to be satisfactory both with regard to the speed of assembly and the simplicity and economy of manufacture of such a unit.

The object of the invention is also to provide a controlled device of the kind defined above which would make it possible to obtain the mounting and assembly of the stirrup of the reduction gear on a base connected to one of the two components constituted by the support and the element to be displaced in a simple and rapid manner.

According to this aspect of the invention, a device for controlling the displacement of an element in relation to a base of the kind defined above, which device comprises, moreover, means for retaining the stirrup in relation to a support connected to one of the two components constituted by the base and the element to be displaced as well as detachable means for connection of the screw cooperating with the wheel to the other component, is characterized in that the abovementioned retaining means comprise a window, or similar, delimited by a base integral with the base, this window being capable of accommodating a part of the stirrup so that the base of this window surrounds the said part to oppose a displacement of the stirrup parallel to the shaft of the motor, and that provision is made for conjugate connection means on the stirrup and the base to cooperate during the fitting of the stirrup in the window, in order to prevent a displacement of the stirrup in relation to the base along a direction substantially orthogonal to the median plane of the window, the unit being such that the stirrup can be mounted in the window while the above mentioned screw is not yet connected to the other part, whereas the detachment of the stirrup in relation to the window is prevented when the above mentioned screw has been connected to the other part.

The window is generally provided so as to receive that sleeve of the stirrup which is coaxial with the shaft of the motor.

Advantageously, the window is arranged in a tab integral with the base. This tab may have the shape of a substantially right angled dihedron whose one face which comprises the above mentioned window is substantially parallel to the shaft of the motor and to the geometrical axis of the wheel of the reduction gear, whilst the other face of the dihedron is slightly separated from the support, whilst being rigidly connected to the latter along its edge remote from the edge of the dihedron, the conjugate connection means at the level of the support being provided on this second face of the dihedron.

In this case of a device for an element guided by two substantially parallel slides the above mentioned tab is provided on the internal face of each slide.

The conjugate connection means of the stirrup and of the support can be constituted by the set of a stud and a hole capable of accommodating this stud during assembly. The stud can be provided on the stirrup and project substantially parallel to the direction of the shaft of the motor, whilst the hole is provided on the support or on an element integral with this support, in particular in the above mentioned face of the tab fixed to the support.

Provision may be made for a surrounding component with a channel shaped cross section having two flat parallel sides intended to surround the ends of the sleeve of the stirrup accommodating the wheel, these faces comprising holes for the passing of the screw which cooperates with the wheel, whilst the portion of the surrounding component ensuring the connection between the sides of the channel comprises a slot or equivalent capable of accommodating a protective cube surrounding the motor shaft.

The detachable means for connecting the screw which cooperates with the wheel, and the other element may comprise a head provided with an eye or bore at one end of the screw and, on the side of the element, a pin intended to be engaged in the above mentioned eye. Provision is made for sufficient play between the external diameter of the pin and the internal diameter of the eye, to allow the necessary displacements during operation. This eye is tightly gripped along the direction of the pin between a stop integral with this pin and elastic means, formed in particular by a deformable washer for making good the play, bearing on the said pin on the opposite side to that of the above mentioned stop.

In the case where the control device is intended for the displacement of an element guided by slides, the above mentioned part carrying the pin cooperating with the eye of the screw is advantageously constituted by a slider which is movable in the slide, the pin being carried by a part integral with the slider.

In the case where the motor of the control device comprises two shaft outputs intended to drive two reduction gears provided at each end of the shafts, the motor is generally situated nearer one of the reduction gears than the other; the two motor shafts are surrounded by protective tubes; the shorter tube is generally integral with the motor casing whilst the longer tube is fitted in a detachable manner to the motor casing. Preferably, this longer tube mounted with scope for sliding parallel to the shaft of the motor over a limited range, provision being made for plastic means for distancing this tube from the motor casing, in particular in order to make good any shortcomings in the interspacing between the parts to be actuated.

The sliding mounting of this tube may be obtained by making provision at the end associated with the motor casing for a sleeve intended to receive the end of the tube and, on this end of the tube, for a groove intended to cooperate with a pin, a screw in particular, fixed to the above mentioned sleeve and passing through the wall of the latter, so as to project into the groove of the tube engaged in the sleeve. The axial length of this groove determines the permitted range of movement of the tube along the axial direction. The elastic means for the distancing of the tube may comprise a helical spring fitted around the tube and bearing on the one side against the end of the above mentioned sleeve, or against a stop integral with the motor casing and on the other side, against a stop, a ring in particular, joined to the tube.

Apart from the arrangements set out above, the invention consists of a certain number of other arrangements which will be discussed in greater detail below in connection with particular modes of embodiment described with reference to the attached drawings but which are in no way restrictive.

FIG. 1 of these drawings is a schematic view in a vertical transverse cross section, with some the outer parts of a control device in accordance with the invention for adjusting the longitudinal position of a seat of a motor vehicle.

FIG. 5 is a view in an exploded perspective of a part of the device and of the reduction gear.

FIG. 9 is a view in perspective of a variant of a device in accordance with the invention in the course of assembly.

FIG. 10 is a view in perspective from another angle of certain components of the device of FIG. 9.

Figure 11:
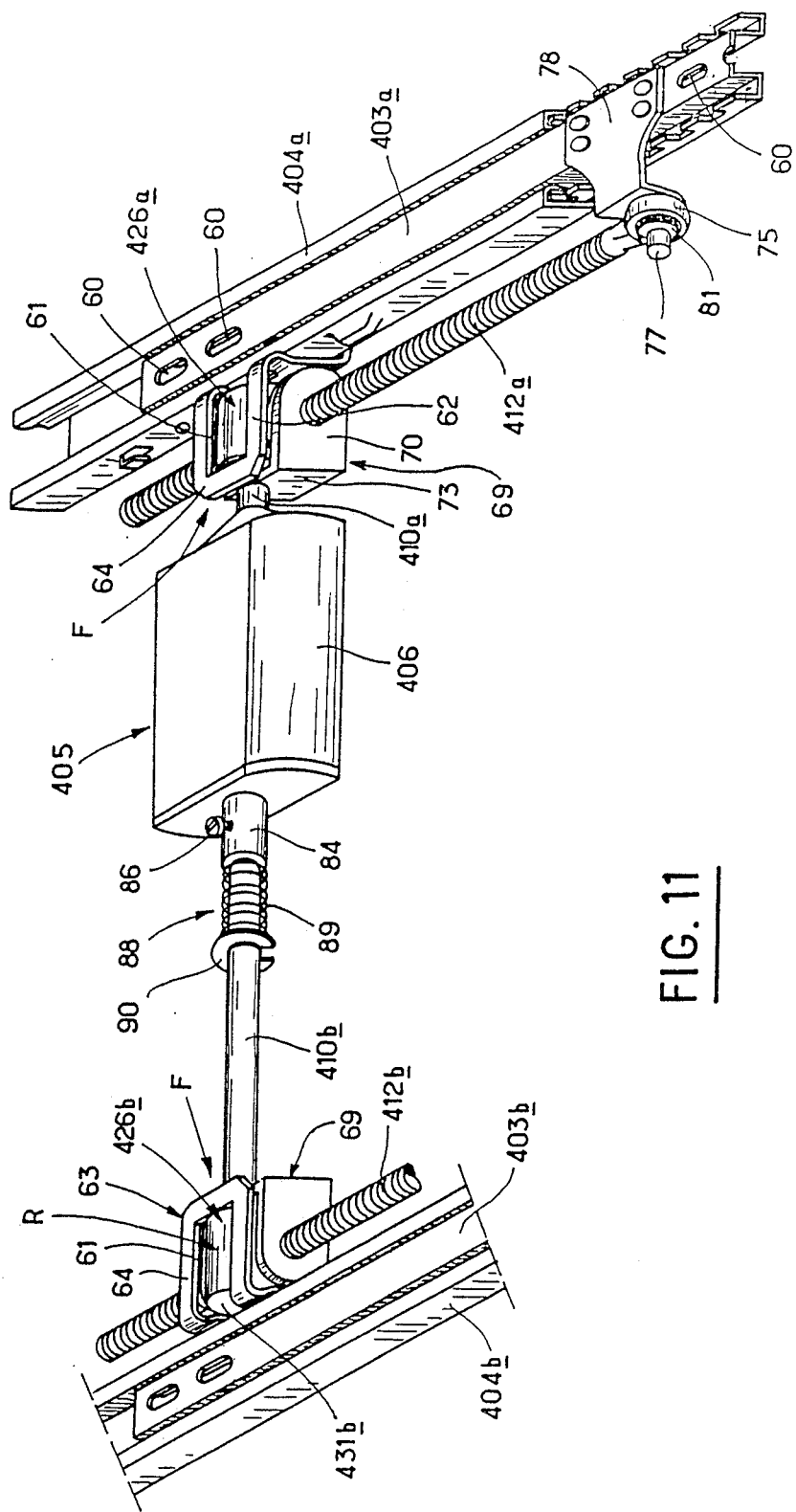

FIG. 11 finally shows the assembled control device in perspective from the same angle as FIG. 9.

Figure 1:
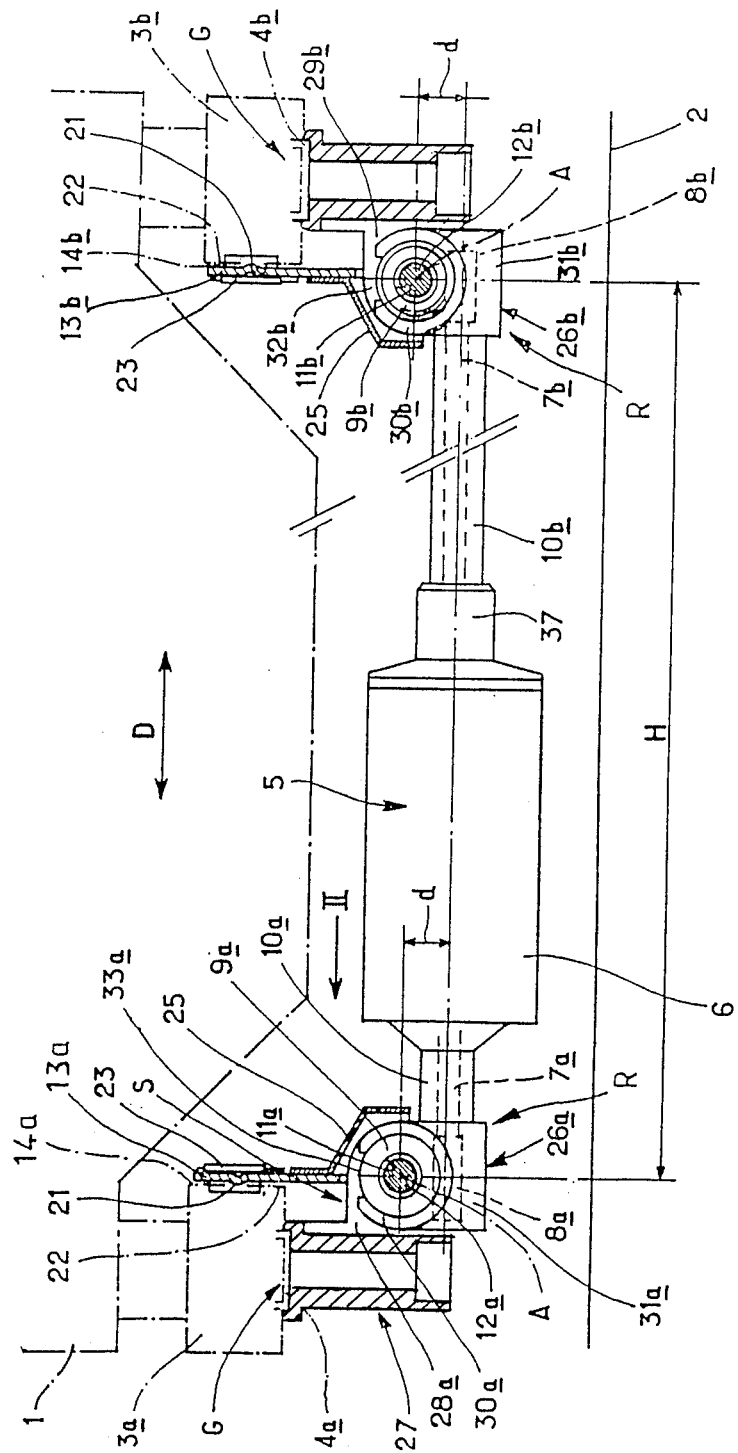
Figure 2:
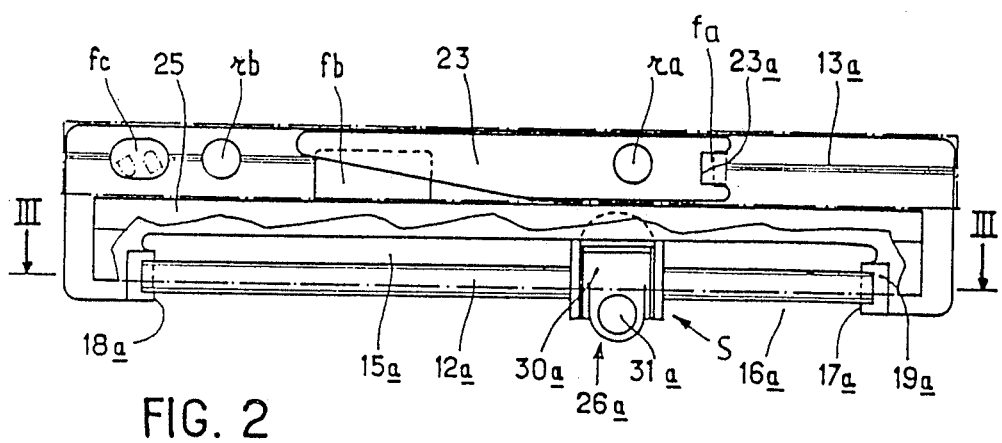
FIG. 2 is a partial view from the left of a flap and of the associated screw along the arrow II of FIG. 1, some parts having been stripped.
Figure 3:
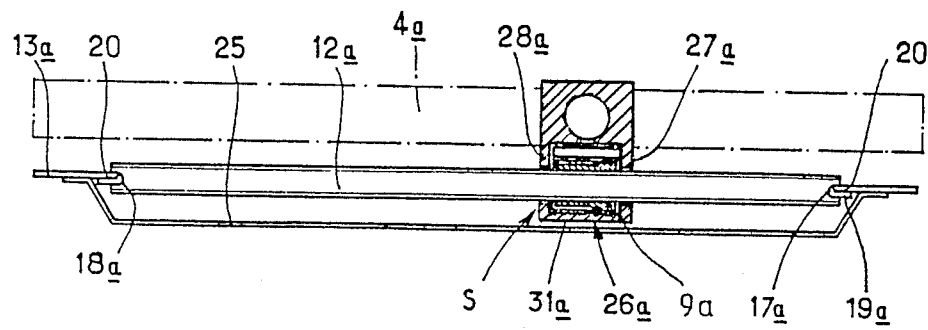
FIG. 3 is a top view in relation in FIG. 1, some parts having been cut.

Referring to the drawings, in particular to FIGS. 1 to 3 a device will be seen for controlling the displacement of an element constituted by a seat 1 of a motor vehicle which has been schematically represented. The seat 1 can be displaced in translation along a direction orthogonal to the plane of FIG. 1, in relation to a base constituted by the floor 2 of the vehicle. The seat 1 comprises below its bottom, sliders 3a, 3b on either side, capable of displacement on substantially parallel slides 4a, 4b, fixed to the floor 2

These slides 4a, 4b, constitute guide means G for the seat 1.

The control device comprises a motor 5 having a casing or shell 6. The axis of the motor is disposed orthogonally, save for the tolerances, in relation to the slides 4a, 4b. The motor 5 is disposed between the two slides and comprises two output shafts 7a, 7b, orientated substantially orthogonally to the slides. Each shaft such as 7a is provided at one end with a worm, such as 8a, or equivalent, capable of driving an associated nut-wheel 9a. The rotary shafts 7a, 7b are disposed within protective tubes 10a, 10b connected to the shell of the motor 5.

These shafts 7a, 7b are rigid and their length is determined by the assembly.

By nut-wheel 9a, one designates a wheel provided on its external surface with a tooth system capable of cooperating with the helical tooth system of the worm 8a, so that the rotation of this worm 8a, produces a geared down rotation of the wheel 9a around the axis A orthogonal to the shaft 7a, this nut-wheel 9a, comprising moreover a threaded bore 11a, capable of cooperating in the manner of a nut with a screw 12a, or an equivalent component accepting A as the longitudinal axis.

Each screw axis 12a is fixed in rotation around its axis A whilst being connected to the element to be displaced 1; in the example considered, the screw 12a is joined to the slider 3a integral with the seat forming the element to be displaced. It is clear that the explanations given with regard to the screw 12a apply directly to the other screws such as 12b having a similar function; in these circumstances, the description given with regard to the components designated by reference numerals followed by the letter a will not be repeated with regard to the reference numerals followed by the letter b.

The screw 12a is mounted on the slider 3a with scope for displacement at least along one direction represented by the double arrow D on FIG. 1, substantially parallel to that of the motor shaft 7a.

As may be seen according to FIGS. 2 and 3, the screw 12a is integral with a flap 13a held against the internal face 14a of the slider 3a. The flap 13a is formed by a sheet of an elongate rectangular shape having a length substantially equal to that of the slide 4a disposed edgewise. The lower portion of the flap 13a comprises a longitudinal cut out 15a (FIG. 2) of a substantially rectangular shape whose opening 16a extending along one of the long sides opens out on the lower longitudinal edge of the flap 13a. The short transverse edges 17a, 18a of the cut out 15a have twice the thickness of that of the sheet forming the flap 13a, which thickness is obtained by folding tongues such as 19a (FIG. 3) which were preserved when the cut out 15a was cut out, through 180° on the opposite side to that of cut-out 15a.

Each screw such as 12a comprises, at its longitudinal ends, parallel slots such as 20 extending along a diameter, capable of accommodating the transverse edges 17a, 18a. The engagement of these edges in the above mentioned slots is effected with sufficient play to leave the screw scope for displacement along the direction of the transverse edges 17a, 18a, which is substantially orthogonal to the axis A.

The flap 13a has an articulation element constituted in particular by a longitudinal rib 21 (FIG. 1) parallel with the long sides of the flap; this rib 21 projecting towards the internal face of the slider 3a is formed, for instance by a longitudinal pressing of the sheet constituting the flap. This rib 21 cooperates with the flat face of side 22 of the slider 3a.

The flap 13a is advantageously arranged to be mounted and maintained on a slider 3a of a standard seat with manual control. In other words, the flap 13a is arranged so as not to require any important conversion of an existing slider 3a, which makes it possible to mount the device easily on a seat originally not scheduled for such equipment.

Figure 6:
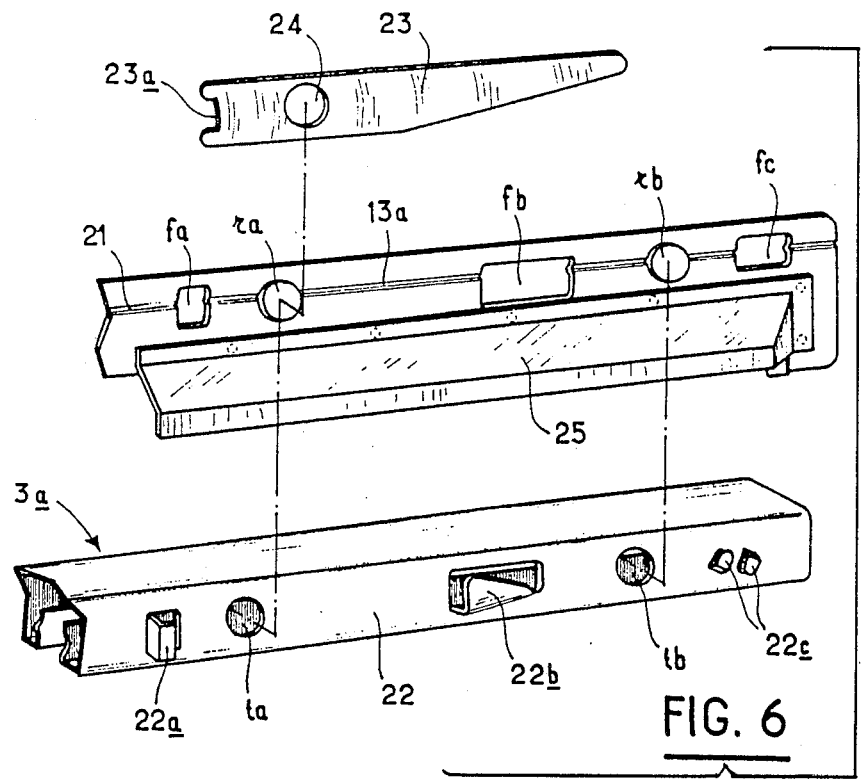
FIG. 6 is a view in an exploded perspective showing the fixing of a flap on a slider.

For instance, as may be seen in FIG. 6, the side 22 may comprise tongues 22a, 22b, 22c obtained by cutting out and deformation of the sheet of side 22, in particular for the positioning of the locking device, (not shown) of a manual control.

In these circumstances, provision is made in flap 13a for windows fa, fb, fc into which the tongues 22a, 22b, 22c are intended to pass, so that the rib 21 can come to bear against the side 22.

Two pins ra, rb, projecting on either side of the flap 13a centred on the axis of the rib 21 and situated towards the ends of the flap 13a are provided to enter into the circular holes ta, tb, of the side 22. The pins ra, rb, are accommodated with sufficient clearance in these holes ta, tb to allow movement of the flap 13a around the rib 21.

The flap 13a is held against the side 22 (with the pins ra, rb engaged in the holes ta, tb) by a key 23 constituted by a plate, one portion whereof has a trapezoidal shape and the other, a rectangular shape, as may be seen in FIGS. 2 and 6. This key 23 is positioned on the opposite side of the flap to that of the slider 3a and cooperates with the tongues 22a, 22b, (or "slashes") of the side 22 of the slider.

The key 23 comprises a hole 24 wherein the head of of the pin ra is engaged. As may be seen in FIGS. 2 and 4, the end of the key 23 intended to cooperate with the tongue 22a with vertical generatrices, comprises a kind of slot 23a wherein the tongue 22a is engaged to prevent the key 23 from turning around pin ra. The key 23 is advantageously constituted by a kind of leaf spring whose transverse cross section is circular arc-shaped and is turning its convexity towards the opposite side to that of side 22.

The flap 13a is thus held tightly gripped against the internal face of the slider 3a with scope for a slight angular deflection around the longitudinal axis parallel to A which is determined by the cooperation of the rib 21 and of the side 22.

A casing may be fixed on the bottom portion of the flap 13a, in particular by weld tacks to cover the screw 12a.

The reduction gear R of which the nut-wheel 9a and the worm 8a form part (see in particular FIG. 5) comprises a stirrup 26a kept fixed in relation to the slide 4a by means of a forked end S with two sides 27a, 28a which come to grip the stirrup 26a along the direction of axis A. The forked end S is fixed under the slide 4a. Each side 27a, 28a comprises a hole 29a for the passing of the screw 12a.

· The stirrup 26a is made of a single piece (monobloc).

This stirrup 26a comprises two intersecting cylindrical sleeves 30a, 31a whose axes are at right angles and interspaced by a distance d (FIG. 1). The internal spaces of these sleeves communicates via an opening W (FIG. 5) corresponding to their intersection.

The sleeve 30a is capable of receiving the nut-wheel 9a. The sleeve 31a receives the end of the tube 10a wherein the shaft 7a and the worm are accommodated. At this end, as may be clearly seen in FIG. 5, the tube 10a comprises on its cylindrical wall, a window 32a corresponding to the intersection of the sleeve 30a, 31a. This window 32a is limited by the intersection of the tube 10a and a cylindrical surface orthogonal to the tube, having the same diameter as the internal diameter of the sleeve 30a and whose axis is situated at distance d from the axis of 30a. The external diameter of the tube 10a is equal to, save for the sliding play, the internal diameter of the sleeve 31a. The threads of the worm 8a project through the window 32a. When the end of the tube 10a is fitted in the sleeve 31a so that the window 32a should be opposite the opening W, the threads of the worm 8a also project through this opening W and can mesh with the nut-wheel 9a engaged in the sleeve 30a. This sleeve 30a may, in its wall, comprise a longitudinal slot 33a situated in the upper portion on the opposite side to the opening W. This slot 33a extends transversely along a circular arc and makes it possible to have access to the external gear thread of the wheel 9a in particular with a view to its greasing. Provision may be made for a cover 34a made of a plastic material to be catch engaged in this slot 33a to close it. Cups 35a are provided to be engaged at each end of the sleeve 30a and to come to cover each axial end of the wheel 9a. The external diameter of the nut-wheel 9a is equal to the internal diameter of the cups 35a which constitute bearings for this nut-wheel 9a. The external diameter of each cup 35a is such that the engagement of these cups in the sleeve 30a is effected with a light grip. The two cups 35a are identical and comprise a cylindrical skirt 35b and a flat transverse bottom 35c provided with a central hole for the passing of the screw 12a. The concavity of each cup 35a is turned towards the nut-wheel 9a. The axial length h of the cylindrical skirt is such that when the cup 35a has been entered into the sleeve 30a and when the external face of the bottom 35c is positioned in the plane of the end of the sleeve, the internal edge of this cylindrical skirt covers the nearer zone m of the edge of the window 32a. The two zones m are situated on either side of the two tops of what may be considered as the small axis of the contour formed by a twisted curve, of the window 32a. The two tops in question are formed by the intersections of the contour of the window 32a and of the plane orthogonal to the axis of the tube 10a and being the mid-perpendicular of this window 32a. This plane passes through the axis of the sleeve 30a when the tube 10a has been correctly engaged in this sleeve. The cooperation of the cylindrical skirts 35b with the zones m of the contour of the window 32a ensures the securing of the sleeve 30a and hence of the stirrup 26a on the tube 10a.

The worm 8a projects into the free space existing between the internal edge of the cups 35a.

These cups 35a which form in some way guidance cups for the wheel a are interchangeable in accordance with the diameter of the wheel 9a. Thus one and the same sleeve 30a combined with appropriate cups 35a can be suitable for various diameters of the wheel 9a.

The nut-wheel 9a can be made of a hard plastic material whilst the cups 35a are metallic.

The sleeve 30a is intended to come between the sides 27a, 28a of the forked end S so that the axis of this sleeve 30a should be aligned with the centres of the holes 29a. Preferably, provision is made for anti-friction and noise reducing washers 36a between the internal face of the sides 27a, 28a and the adjoining cups 35a. These washers may comprise a collar 37a on the opposite side to that of the cup 35a intended to be engaged in the hole 29a. The screw 12a passes through these collars 37a.

The washers 36a can be integral with the cover 34a so that the unit forms a tangent plate which can surmount the sleeve 30a.

The assembly of the reduction gear R, represented in FIG. 5 is extremely simple and fast and follows from the preceding explanations.

The end of the tube 10a is fitted by sliding in the sleeve 31a in such a way that the window 32a comes to be opposite the opening W. The worm 8a projects with its threads through this opening W.

The wheel 9a is then fitted in the sleeve 30a by a translational motion accompanied by a rotational motion so that the external thread of the wheel 9a meshes with the worm 8a. When this engagement has been obtained, the stirrup 26a is secured against translation along the direction of the axis of the tube 10a. The cups 35a are positioned on the ends of the wheel 9a. At that point, the slot 33a can be closed by the cover 34a but this closure can be effected later.

After the anti-friction washers 36a have been positioned against the internal face of the sides 27a, 28a, the stirrup 26a is engaged between these sides so that the sleeve 30a should be coaxial with the holes 29a.

Causing the screw 12a to pass through the holes 29a, this screw 12a is engaged in the nut of the nut-wheel 9a causing it to turn to obtain a screwing action.

The assembly of the reduction gear R properly so called, is then completed. The screw 12a remains to be fitted in the flap 13a, the latter then being assembled on the side 22 of the slider 3a.

The bulk of the reduction gear formed in some way by the set of worm 8a, the wheel 9a, the stirrup 26a, and of the forked end S is small.

The tube 10a, of short length, is integral with the casing 6 of the motor. The reaction couple of the motor 5 exerted on the casing 6 is transmitted by the tube 10a to the stirrup 26a which transmits it to the forked end S and to the base. Thus no direct connection is necessary between the casing 6 and the base 2.

The motor 5 is situated nearer the slide 4a than the slide 4b as may be seen in FIG. 1. Whilst the tube 10a which is shorter in length, is integral with the casing 6, the other longer tube 10b can be freely fitted for sliding and rotation in a sleeve 37 extending the casing 6.

The operation of the device described above is as follows.

To displace the seat 1 in translation on the slides 4a, 4b, the motor 5 is caused to rotate in the direction of rotation corresponding to the direction of the required displacement.

The rotation of the motor produces the rotation at lower speeds of the nut wheels 9b which are maintained fixed along the direction of the axis A. The cooperation of the nut 11a, 11b driven in rotation with the associated screw 12a, 12b, fixed in rotation produces the longitudinal displacement along the direction of axis A, of the screw 12a, 12b and hence of the sliders 3a, 3b and of the seat 1 connected to these sliders.

Because the shafts 7a, 7b are rigid and have a fixed length and since, moreover, the stirrups 26a, 26b are rigidly connected to the tubes 10a, 10b which are themselves connected to the shell of the motor 5, the transverse distance H (FIG. 1) between the two axes A of the screws 12a, 12b is constant in the transverse plane passing through the axis of the motor.

Now, because of the inevitable production tolerances, the parallel alignment between the slides 4a, 4b and hence between the screws 12a, 12b may not be perfect. Moreover, the orthogonal alignment between the screws 12a, 12b on the one hand and the shafts 7a, 7b [on the other], may not be perfect either.

Thanks to the assembly of the screws 12a, 12b with scope for displacement along the direction D, the possible variation of the distance between the axes of the screws 12a, 12b in the course of their translation, is compensated by their slight transverse displacement so that they remain constantly equal to H in the transverse plane passing through the axis of the motor 5, without any inadmissible stresses arising therefrom at the level of the various components cooperating together.

Assembly is particularly simple and economic because it is possible to use rigid shafts joined to the motor, for instance by simple force fitting.

It should be noted that the lack of parallel alignment between the slides 4a and 4b may be as much as a few millimeters, that is to say, that the difference between the front and rear interspacing of these slides may be of the order of a few millimeters whilst in the case of a strict parallelism, this difference would be zero. The floating mounting of the screws 12a, 12b in accordance with the invention, allows such a difference to be easily absorbed.

Figure 4:
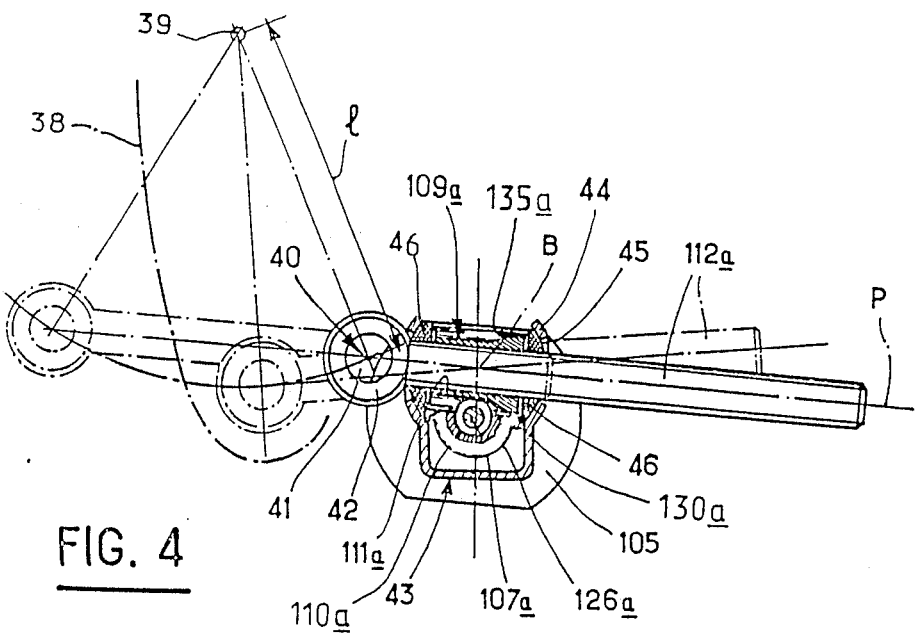
FIG. 4 is a schematic representation of a device in accordance with the invention for controlling a rotational displacement in particular for controlling the inclination of a seat back.

Referring to FIG. 4, one may see the application of a device in accordance with the invention to the actuation of the rotational displacement of an element constituted by, for instance, the seat back 38 schematically represented, of a seat of a motor vehicle. This seat back 38 may rotate around a pivot constituted by a transverse pin 39 perpendicular to the plane of FIG. 4.

The components of the control device of FIG. 4 performing a similar function to the components already described with reference to FIGS. 1 to 3, will be designated by a numeral equal to the sum of 100 and of the reference numeral designating the similar component of FIGS. 1 to 3. The description of these components will be undertaken succinctly or will not be repeated because it has already been undertaken with reference to FIGS. 1 to 3.

The screw 112a engaged in the nut-wheel 109a is connected at one end to the seat back 38 by an articulation 40 whose centre is situated at a distance 1 from the pivot 39. The articulation 40 is formed, for instance, by a swivel joint 41 integral with the seat back 38, this swivel joint being capable of cooperating with a complementary recess provided in a head 42 integral with the screw 112a.

The articulation 40 does not only permit rotation of the screw 112a around an axis parallel to the pivot 39 and passing through the centre of the articulation 40, but also sufficient angular deflection of the screw 112a in a plane parallel to the shaft 107a of the motor and whose trace on the drawing of FIG. 4 is constituted by the line P identical with the axis of the screw 112a. In other words, the axis of the said screw 112a may, following the permitted deflection, move out of the plane of FIG. 4.

The nut-wheel 109a is mounted with scope for rotation around a transverse axis parallel to the pivot 39 and whose tracing is represented by point B in the drawing of FIG. 4. This point is situated halfway on the geometrical axis of the wheel 109a. According to the example of the assembly of FIG. 4 allowing such rotation, the set of the motor 105 and of the stirrup 126a is mounted on a support 43 integral with the base, with scope for oscillation around the axis passing through point B.

The support 43 is constituted by a kind of channel shaped section whose portion such as 44 of each side remote from the transverse web of the channel is curving according to a spherical cup shape, or possibly according to a cylindrical surface, turning its concavity towards the inside of the channel. Each portion such as 44 comprises an opening 45 for the passing of the screw 112a, this opening having sufficient angular scope to allow the deflections of the screw between two end positions whereof one is represented in solid lines and the other in dots and dashes in this FIG. 4. The stirrup 126a is provided at each end of the sleeve 138a of the cups 135a similar to the cups 35a described with reference to FIG. 5 which are arranged to serve as bearings for the nut-wheel 109a and to ensure that the stirrup is locked on the tube 110a; the centring parts 46 in the form of spherical segments whose convex surface turned towards the outside is conjugate with the concave surface of the parts 44, are provided at each end of the sleeve 130a and of the said parts 44. As a variant, the cups 135a could have a spherical bottom conjugate with that of the concave surfaces 44.

Each part 46 comprises openings for the passing of the screw 112a. These parts 46 are advantageously made of an anti-friction material and can be interconnected by a transverse element to form a tangent plate, (as has already explained with regard to the washers 35a of FIG. 5) which is capable of coming to surmount the sleeve.

The set of the sleeve 131a and of these parts 46 and, together with them, the motor 5, can pivot around point B constituting the centre of the concave surfaces of the parts 44.

Preferably, provision is made for a screw such as 112a on either side of the seat back 38, the two screws being actuated by the same motor 105 which comprises two output shafts as represented in FIG. 1.

The operation of the device represented in FIG. 4 follows directly from the preceding explanations. Driving the shaft 107a by motor 105 in one direction or the other, produces the displacement of the screw 112a along the direction of its axis, this screw being prevented from turning around the said axis. The seat back 38 is displaced in rotation around the pivot 39. In the course of this displacement the inclination of the screw 112a varies, as well as the orientation of the motor around the axis perpendicular to the plane of FIG. 4 passing through point B.

Although the screw 112a is held in the nut 111a of the nut-wheel 109a, a shortcoming in the parallel alignment between the pivot 39 and the shaft 107a can be absorbed by the scope for displacement of the screw 112 along a direction substantially parallel to that of the motor shaft 107a. Similarly a shortcoming in the orthogonal alignment between the screw 112a and the shaft 107a can also be compensated.

Figure 7:
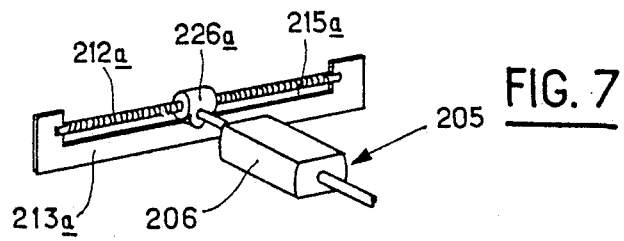
FIGS. 7 and 8 are simplified diagrams of variants of the embodiment.

Referring to FIG. 7, one may see a partial schematic representation of a variant of the mode of embodiment, in accordance wherewith, the screw 212a is secured against translation along its axis in relation to the base (not shown), whilst the motor 205, its casing 206 and the stirrups such as 226a are movable in translation, parallel to the axis of the screw 212a. The casing 206 is connected to the element to be displaced, for instance the seat of a motor vehicle. The screw 212a is still mounted in a flap 213a whose cut out 215a opens towards the top; this flap is mounted, as previously explained, with scope for angular deflection around a longitudinal axis. However, according to the variant of FIG. 7, the flap 213a is not mounted on the movable slider, but on a component, for instance the slide, (not shown), fixed in relation to the base.

It is clear that the control device described above with reference to FIGS. 1 to 3 can be used to actuate translational displacements other than the one described in this particular example. One may actuate:

the height adjustment of the seat (raising);
the angular adjustment of the seat;
the height adjustment of the head rest;
the device can also be used for actuating a window raiser, an opening roof and if required, a jack.

Figure 8:
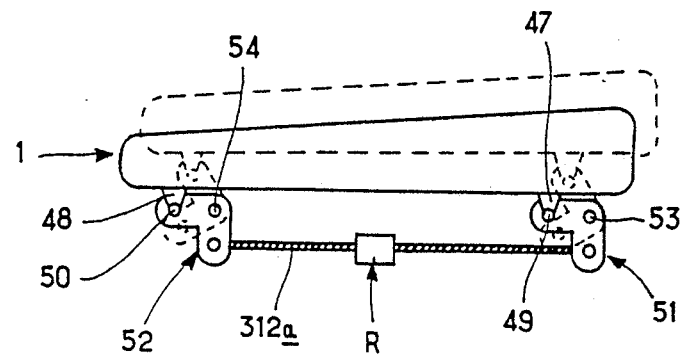

FIG. 8 is a diagram of a variant of the embodiment for adjusting the height of seat 1. Provision is made under the seat base at the front and at the rear on either side, for tabs 47 and 48, integral with the base carrying pivots 49, 50 respectively. The end of a link 51, 52 in the shape of a substantially right angled bell crank, is articulated on each pivot. These links 51, 52 are articulated towards the apex of the angle, on pins 53, 54 fixed in relation to the sliders. The lower ends of the links 51, 52 are joined in an articulated manner to the ends of a screw 312a, similar to the screw 12a already discussed. This screw 312a passes through a reduction gear R, similar to the one already described, fixed in position in relation to the sliders. A motor similiar to the motor 5 of FIGS. 1 and 5 drives the nut-wheel (not visible) of the reduction gear which produces by its rotation, the translational displacement of the screw 312a. A simultaneous rotation of the links 51, 52 follows therefrom around their pins 53, 54, the direction of this rotation depending on the direction of the translational displacement screw 312a in relation to the base. The seat 1 is raised or lowered according to the direction of rotation of the links 51, 52.

It should be noted that, in all cases, the reduction gear R is of the irreversible type, that is to say that the motor can drive the load by means of the nut-wheel but a reverse operation is not possible.

As a variant of the device of FIG. 8, provision could be made at the front of the seat, instead of the links 51 for two vertical slides combined with vertical screws and a motor in a similar manner to that described for FIGS. 1 and 5. The rear links 52 would be controlled by a different motor so that the seat could be angularly adjusted (inclination in relation to the horizontal).

The preceding description has been undertaken with embodiments causing a nut-wheel 9a to intervene. However, it is clear that the particularly advantageous arrangement of the reduction gear R can prove suitable in the case where the wheel 9a would be fixed for rotation with the screw 12a. The cooperation of the wheel and of the screw is then ensured by their linkage in rotation of the two components.

Referring to FIG. 9, a device may be seen controlling the displacement of an element constituted by a slider 403a capable of translational displacement within a guide slide 404a. The device may be used in particular for controlling the displacement of a seat (not represented) of a motor vehicle. The slider 403a would be fixed under the seat in particular by means of holes 60 of an oblong shape provided at various points of this slider, whilst the slide 404a would be fixed to the floor of the vehicle.

The control device comprises an electric motor 405 having a casing or shell 406. The axis of the motor is disposed substantially orthogonally to the slide 404a. Generally the motor 405 is disposed between two slides 404a, 404b (or equivalent components), as may be seen in FIG. 11; the motor 405 comprises two output shafts orientated substantially orthogonally to the slides. Each shaft of the motor is provided at one end with a worm such as 408a (FIG. 10) or an equivalent component, capable of driving an associated wheel 409a whose axis is orthogonal to the direction of the shaft of the motor. The rotary shafts of the motor are disposed within protective tubes 410a, 410b linked or intended to be linked to the shell 406 of the motor.

The wheel 409a is of the nut-wheel type, that is to say, it comprises on its external surface, a set of teeth capable of cooperating with the helical teeth of the worm 408a; this nut-wheel 409a comprises, moreover, a threaded bore 411a capable of cooperating in the manner of a nut with a screw 412a or equivalent component. The axis A of the wheel 409a is orthogonal to the shaft of the motor 405 when the device is assembled.

The unit of the worm 408a and of the wheel 409a forms part of a reduction gear R which comprises a stirrup 426a comprising two intersecting cylindrical sleeves at right angles 430a, 431a. The internal spaces of these two sleeves communicate via an opening W (FIG. 10) corresponding to their intersection. The sleeve 430a whose external cylindrical wall is closed, is open at its two axial ends and is capable of accommodating the wheel 409a which is itself intended to be traversed by the screw 412a. The other sleeve 431a accommodates the end of the tube 410a wherein the shaft of the motor and of the worm 408a are accommodated. At this end, as may be seen in FIG. 10, the tube 410a comprises on its cylindrical wall, window 432a corresponding to the intersection of the sleeves 430a and 431a. Threads of the worm 408a project through the window 432a.

For mounting the reduction gear R, the above mentioned end of the tube 410a is fitted in the sleeve 431a of the stirrup 426a so that the window 432a should come to be opposite the opening W and that the threads of the worm 408a should mesh with the nut-wheel 409a.

The device comprises retaining means F for the stirrup 426a in relation to a support connected to one of the parts constituted by the element 403a or the base. In the example considered, the retaining means F are connected to the slide 404a which is itself fixed to the base constituted in the example considered by the floor of a motor vehicle.

Provision is made for connection means L between one end of the screw 412a and the other component which, in the present case, is constituted by the slider 403a.

It is clear that the control device could be used to control a rotational motion around a fixed geometrical axis (for instance, for adjusting the angle of inclination of a seat of a motor vehicle) instead of the translational actuation envisaged by way of example in FIGS. 9 and 11.

The retaining means F comprise a window 61 or similar delimited by a frame 62 integral with a wall of the slide 404a constituting the support referred to above. The window 61 is capable of accommodating a portion of the sitrrup 426a, as may be seen in FIG. 11 so that the frame 62 of this window surrounds the said portion of the stirrup 426a to oppose a displacement of the stirrup parallel to the shaft of the motor and the geometrical axis of the tubes such as 410a.

The window 61 has a general rectangular shape whose long dimension is orientated orthogonally to the longitudinal direction of the slide 404a. The window 61 is advantageously provided so as to accommodate the sleeve 431a which is coaxial with the shaft of the motor 405.

Preferably, the window 61 is arranged in a tab 63 integral with the support constituted by the slide 404a. More precisely, this tab 63 is provided on the internal side of the slide 404a; the tab 63 has the shape of a substantially right-angled dihedron whereof one face 64 is substantially parallel to the shaft of the motor 405, that is to say, to the geometrical axis of the tube 410a, whilst the other face 65 of the dihedron is separated from the internal wall 66 of the slide 404a, whilst being substantially parallel to this internal wall 66. The edge of the face 65 which is remote from the edge of the dihedron and from the other face 64 is rigidly joined to the internal wall 66. According to the representation of the FIG. 9, the face 64 is horizontal and is situated at the upper level whilst the edge of the face 65 fixed to the wall 66 is situated at a lower level. The tab 63 can be fixed by welding or by any other means to the wall 66. As a variant, this tab 63 can be obtained from a strip of material cut out in the slide 404a and suitably bent.

Provision is made for conjugate connection means N on the stirrup 426a and on the support constituted by the slide 404a. These connection means N are capable of cooperating during the fitting of the stirrup 426a in the window 61 to prevent a displacement of the stirrup 426a in relation to the slide 404a along a direction substantially orthogonal to the median plane of the window. According to the representation of FIG. 9, these means N are capable of preventing displacement at least along the vertical direction of the stirrup 426a in relation to the slide 404a, the median plane of the window 61 being substantially horizontal.

Preferably, the connection neans N are constituted by a set of a stud 67 and a hole 68 capable of receiving this stud. Advantageously, the stud 67 is provided on the external wall of the stirrup 426a and more precisely of the sleeve 430a (see FIG. 10) and projects towards the outside parallel to the shaft of the motor 405 towards the slide 404a. The hole 68 is provided in the face 65 of the tab 63; because the side 65 is separated from the internal wall 66 of the slide, the stud 67 can project through the hole 68 beyond the face 65 towards the wall 66. The stud 67 generally has a circular cross section and the hole 68, which is also circular, has a sufficient diameter to receive the stud 67 with clearance allowing the assembly of the unit.

Provision may be made for a surrounding component 69 with a transverse channel shaped cross section to encompass the sleeve 430a. This component 69 has two flat parallel faces 70, 71 surrounding the ends of the sleeve 430a. The faces 70, 71 comprise holes such as 72 for the passing of the screw 412a. The portion 73 of the component 69 ensuring the connection between the sides of the channel, comprises a slot 74 or an equivalent part capable of accommodating the tube 410a. In the example of the embodiment of FIG. 9, this slot 74 is provided on the upper edge of the part 73 and is substantially semi-circular.

The detachable connection means L between the screw 412a and the slider 60 comprise a head 75 provided at one end of the screw and fitted with an eye or a bore 76. On the side of the slider 403a, the connection means L comprise a pin 77 intended to be engaged in the eye 76. The pin 77 is integral with a right-angled component 78, fixed to the slider 403a. The pin 77 projects on the internal side of the slide 66 along a direction substantially parallel to that of the shaft of the motor 405. Provision is made for sufficient radial play between the external diameter of the pin 77 and the internal diameter of the eye 76 to allow the angular deflections necessary for the operation and assembly of the device. The head 75 and the eye 76 are gripped along the direction of the pin 77 between a stop 79 integral with this pin and elastic means formed by a deformable washer 80 allowing the play to be made good. The stop 79 is advantageously formed by the side of the right-angled component 78 which carries the pin 77 and which is orthogonal to this pin. The deformable washer 80 situated on the opposite side of the head 75 to that of the stop 79, bears on the pin 77 by means of a split ring 81 intended to be anchored in an annular groove 82 provided on the pin 77. A flat washer 83 may be disposed between the deformable washer 80 and the split ring 81.

In the example of the embodiment envisaged, the motor 405 comprises two output shafts intended to drive two reduction gears 426a 426b (see FIG. 11), provided at each end of the shafts. The motor 405 is situated nearer to the reduction gear 426a; the tube 410a, of shorter length which surrounds the corresponding shaft may be integral with the casing 406 of the motor. The tube 410b which is longer, surrounding the shaft situated on the other side of the motor, is advantageously mounted with scope for sliding parallel to the shaft of the motor over a limited range.

The sliding mounting of the tube 410b may be obtained by providing a sleeve 84 intended to accommodate the end of the tube 410b at the end of the casing 406 associated with this tube. Provision is made on this end for a peripheral groove 85 (FIG. 9) to cooperate with a pin formed in particular by a screw 86 fixed in a threaded hole 87. The screw 86 passes radially through the wall of the sleeve 84 so as to project into the groove 85 when the unit is assembled. It should be noted that the screw 86 does not come to exert a radial thrust against the bottom of the groove 85 but only projects into this groove by a distance sufficient to come to bear along the axial direction against the radial shoulders situated at the two ends of the groove 85. The axial length y of this groove 85 determines the range of the displacement allowed to tube 410b along the axial direction.

Provision is made for elastic means 88 for keeping the tube 410b at a distance from the casing 406 of the motor, in particular in order to make good any possible shortcomings in the interspacing between the slides 404a, 404b and the sliders 403a, 403b. Preferably, the elastic means 88 are constituted by a helical spring 89 intended to operate in compression. This spring 89 is capable of being fitted around the tube 410b and to bear on one side against the end of the sleeve 84 and on the other side, against a stop 90 formed in particular by a split ring anchored in a peripheral groove provided on the tube 410b.

This being the case, the mounting and assembly of a control device in accordance with the invention are effected as follows, which is easily deduced from the preceding explanations.

The output shafts of the motor 405 are positioned on each one of the outlets as well as the tubes 410a, 410b. The stirrups 426a, 426b are mounted at the ends of the tubes 410a, 410b which are fitted in the sleeves 431a, 431b.

The wheels such as 409 are mounted in the other sleeve 430a so that the external thread of each wheel comes to cooperate with the threads of the worms such as 408a projecting through the opening 432a. The components such as 70 are then positioned to surround the sleeves 430a, 430b and the screws 412a, 412b are engaged in the nut of the corresponding wheels.

The heads 75 of the screws such as 412a are maintained at a level different from that of the pins 77 so that the stirrups such as 426a should slope in relation to the vertical. The unit is arranged in such a way that the stirrup 426a sloping in this way, may be introduced under the face 64 of the dihedron whilst the stud 67 is engaged in the hole 68. It should be noted that the scope for the axial sliding of the tube 410b facilitates the positioning of the stud similar to the stud 67 provided on the stirrup 426b.

When the studs such as 67 have been positioned, the screws such as 412a are displaced with a rocking motion substantially around the axis of the stud 67 so as to bring the eye 76 opposite the pin 77.

During the rotational or rocking motion of the screw 412a around the axis of the stud 67, the sleeve 431a describes a motion around the axis of the stud 67 which causes the upper cylindrical portion of the sleeve 431a to enter into the window 61. The flat end faces of the sleeve 431a come into the vicinity of the small sides of the window 61, parallel to the longitudinal direction of the slide 404a; the cooperation of these flat end faces of the sleeve 432a and of the small sides of the window 61 ensures that the stirrup 426a is kept in position along a direction parallel to that of the shaft of the motor. The pin 77 is then engaged in the eye 76 by an oscillating motion of the screw 412a in a plane passing through the axis of this screw and the geometrical axis of the pin 77. This oscillating motion is made possible by the play provided between the various cooperating parts. The head 75 is then locked by means of the elastic washer 80, the flat washer 83 and the ring 81 which is positioned in the groove 82.

The connection established between the head 75 and the pin 77 ensures the locking of the reduction gear R in relation to the tab 63 and the slide 404a. To make it possible to separate the reduction gear R and the stirrup 426a from the tab 63, it is necessary to start by detaching the head 75 from the pin 77 to allow the rocking of the screw 412a around the axis of the stud 67 and to release the sleeve 431a from the window 61.

It should be noted that the engagement and release of the sleeve 431a in relation to this window 61 can be facilitated by a slight rocking motion around an axis substantially parallel to the longitudinal axis of the slide 404a. The assembly or dismantling on the side of the other slide 404b is effected under the same conditions as those set out above.

This assembly is therefore effected in a simple and rapid manner whilst being particularly effective.

The example of the embodiment described essentially concerns a device controlling a translational displacement.

It is clear that the device of the invention can be used to control a rotational motion, for instance, to adjust the inclination of the back of a seat of a motor vehicle. The head 75 of the screw would then be connected to a component describing a rotational motion around a transverse axis. The screw 412a would then have a variable inclination depending on the angular position of the control component.

We claim:

1. A device for controlling the displacement of an element in relation to a base comprising a motor having a shaft provided at an end with a worm, the shaft having an axis extending in a given direction, a stirrup including two orthogonal and intersecting cylindrical sleeves defining an opening at the intersection thereof, one of said sleeves of said stirrup having a nut-wheel disposed therein, said nut-wheel having an axis of rotation that is orthogonal to the shaft axis, said worm being housed in a tube and said motor having a casing connected to said tube, said tube having a cylindrical wall which includes a first window located adjacent said opening whereby a portion of said worm projects through said first window of said tube and said opening to engage said nut-wheel in said one sleeve, said one sleeve having open opposite ends and the device further including a surrounding component having parallel faces disposed to close said ends of said one sleeve, said parallel faces having holes for receiving a screw which cooperates with said nut-wheel;

means for flexibly securing said stirrup relative to said base including a frame which defines a second window, said frame connected to said base and said second window receiving a portion of said stirrup so that said frame completely surrounds said portion to allow limited displacement of said stirrup relative to said base in said given direction, said stirrup and said means for securing further including conjugate connection means for preventing displacement of said stirrup relative to said base in a second direction which is mutually perpendicular to said given direction and said axis of rotation of said nut-wheel; said screw having means for detachable connection to said displaceable element including a head provided with an eye for receiving a pin connected to said displaceable element.

2. A device according to claim 1, characterized in that cups engage the nut-wheel at each end of said one sleeve, these cups serving as bearings for the nut-wheel.

3. A device according to claim 2, characterized in that the cups (35a) comprise a cylindrical skirt (35b) whose axial length (h) is such that an internal edge of this skirt covers the edge of the first window (32a) of the tube (10a), whereby said tube is secured with respect to said stirrup.

4. A device according to claim 2 or 3, characterized in that the nut-wheel (9a) is made of a hard plastic material whilst the cups (35a) are metallic.

5. A device according to claim 1, characterized in that the second window is designed in such a way as to receive the second (426a) of the sleeves of the stirrup (426a) which is coaxial with the shaft of the motor an axial section of the second of said sleeves comprises said portion received by said second window.

6. A device according to claim 1, characterized in that the second window (63) is arranged in a tab (63) integral with the base (404a).

7. A device according to claim 6, characterized in that the tab is in the shape of a substantially right dihedral angle having one face which comprises said second window and is substantially parallel to both the shaft axis and the axis of rotation of the nut-wheel of the reduction, while the other face of the dihedral angle is slightly spaced from the base and rigidly connected thereto along an edge of said other face which is remote from said one face said other face includes a provision for said conjugate connection.

8. A device according to claim 1 characterized in that the conjugate connection means for connecting the stirrup and the base are constituted by the set of a stud and a hole capable of receiving this stud during assembly.

9. A device according to claim 8, characterized in that the stud is provided on the stirrup and projects therefrom substantially parallel to said given direction while the hole is provided on a tab integral with said base.

10. A device according to claim 1, characterized in that said means for detachable connection further comprises a deformable washer whereby said head is biased toward a stop integral with said pin and said displaceable element.

11. A device according to claim 1 wherein said motor shaft comprises two output shafts which extend from opposing first and second ends of said casing; attached to said first and second casing ends, and housing said output shafts, are respective first and second tubes; said first tube being longer than said second tube, said first tube is telescopically mounted relative to said casing for limited sliding relative thereto; and elastic means for distancing said first tube from said casing.

12. A device according to claim 11, characterized in that third a sleeve on said first end of said casing receives said first the tube whereon a groove is provided to cooperate with, a screw fixed on the said third sleeve, said screw passes through the wall of the latter so as to project into the groove of said first tube, said elastic means positioned between said third sleeve and a stop connected to said first tube.

13. A device according to claim 1, for controlling the displacements of a seat of a motor vehicle in translation.

* * * * *